United States Patent
Bharadwaj et al.

(10) Patent No.: US 9,407,700 B2
(45) Date of Patent: Aug. 2, 2016

(54) INTELLIGENT DISCOVERY OF NETWORK INFORMATION FROM MULTIPLE INFORMATION GATHERING AGENTS

(71) Applicant: International Business Machines Corporation, Armonk, NY (US)

(72) Inventors: Sunil Bharadwaj, Portland, OR (US); David L. Merbach, Rochester, MN (US); Robert Basham, Aloha, OR (US); Allen R. Heitman, Rochester, MN (US); Sumant Padbidri, San Jose, CA (US); Gary T. Axberg, Lake Elmo, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/306,379

(22) Filed: Jun. 17, 2014

(65) Prior Publication Data

US 2014/0297853 A1    Oct. 2, 2014

Related U.S. Application Data

(63) Continuation of application No. 13/153,172, filed on Jun. 3, 2011, now Pat. No. 8,775,499.

(51) Int. Cl.
*G06F 15/16* (2006.01)
*G06F 15/173* (2006.01)
*H04L 29/08* (2006.01)
*H04L 12/24* (2006.01)

(52) U.S. Cl.
CPC ............ *H04L 67/1097* (2013.01); *H04L 12/24* (2013.01); *H04L 41/00* (2013.01); *H04L 41/046* (2013.01); *H04L 41/12* (2013.01); *H04L 67/16* (2013.01); *H04L 69/329* (2013.01)

(58) Field of Classification Search
CPC ........ H04L 41/046; H04L 41/12; H04L 67/16
USPC .......................................................... 709/202
See application file for complete search history.

(56) References Cited

U.S. PATENT DOCUMENTS

| | | |
|---|---|---|
| 5,185,860 A | 2/1993 | Wu |
| 5,638,494 A | 6/1997 | Pinard et al. |
| 5,740,362 A | 4/1998 | Buickel et al. |
| 5,812,771 A | 9/1998 | Fee et al. |

(Continued)

FOREIGN PATENT DOCUMENTS

| | | |
|---|---|---|
| KR | 2001011277 | 2/2001 |
| WO | WO0248910 | 6/2002 |

OTHER PUBLICATIONS

Lazar et al., "ATM Network Discovery Using Mobile Agents", Proceedings 24th Conference on LCN'99, p. 98-105.

(Continued)

*Primary Examiner* — June Sison
*Assistant Examiner* — Adam Cooney
(74) *Attorney, Agent, or Firm* — Walter W. Duft

(57) ABSTRACT

A system, method and computer program product for intelligent discovery of network information from multiple information gathering agents adapted to discover information concerning the network. The discovery agents each have an associated discovery capability. Based on consideration of the agent discovery capabilities, discovery assignments are computed and network discovery is performed according to the assignments so as to reduce discovery poll overhead.

18 Claims, 10 Drawing Sheets

(56) References Cited

U.S. PATENT DOCUMENTS

| | | |
|---|---|---|
| 5,968,116 A | 10/1999 | Day, II et al. |
| 5,978,594 A | 11/1999 | Bonnell et al. |
| 5,999,940 A | 12/1999 | Ranger |
| 6,052,727 A | 4/2000 | Kamalanathan |
| 6,137,782 A | 10/2000 | Sharon et al. |
| 6,182,136 B1 | 1/2001 | Ramanathan et al. |
| 6,236,983 B1 | 5/2001 | Hofmann et al. |
| 6,253,240 B1 | 6/2001 | Axberg et al. |
| 6,269,400 B1 | 7/2001 | Douglas et al. |
| 6,286,047 B1 | 9/2001 | Ramanathan et al. |
| 6,421,723 B1 | 7/2002 | Tawil |
| 6,691,116 B1 | 2/2004 | Bart |
| 6,801,507 B1 | 10/2004 | Humpleman et al. |
| 2002/0083120 A1 | 6/2002 | Soltis |
| 2002/0129230 A1 | 9/2002 | Albright et al. |
| 2002/0133583 A1 | 9/2002 | Fee et al. |
| 2002/0143942 A1 | 10/2002 | Li et al. |
| 2002/0161883 A1* | 10/2002 | Matheny et al. ............ 709/224 |
| 2002/0166002 A1 | 11/2002 | Milner et al. |
| 2003/0046427 A1* | 3/2003 | Goringe et al. ............ 709/242 |
| 2003/0097425 A1* | 5/2003 | Chen ........................ 709/220 |
| 2003/0177168 A1 | 9/2003 | Heitman et al. |

OTHER PUBLICATIONS

Stahl, E., "Employing Intelligent Agents or Knowledge Discovery", Proceedings 14th Int. Cont. on Data Engineering, Feb. 1998, p. 104.

Chen et al., "An Integrated Interactive Environment for Knowledge Discovery From Heterogenous Data Resources", Journal of Information and Software Technology, Jul. 2001, p. 487-496.

Ross, K., Netware and Management Software Trends for 10base-t, 1992, p. 1-5.

\* cited by examiner

TABLE 1

| AGENT | SWITCH/NETWORK |
|---|---|
| 1 | A |
| 2 | A, B |
| 3 | B |

*FIG. 6A*

TABLE 2

| AGENT | SWITCH/NETWORK |
|---|---|
| 1 | A |
| 2 | B |
| 3 | NONE |

*FIG. 6B*

TABLE 3

| Scanner | Granularity | Reported in XML |
|---|---|---|
| Brocade API | SAN | SANs<br>Zone Set, Zones, Zone Members in the SANs<br>Nodes, Ports in the zones connected to the SANs |
| Subsystem CIM | Subsystem | CIM subsystem information |
| ED/FI | Switch/Port | Switch parameters for switches<br>Sensor parameters for switches<br>Port statistics for ports in the switches |
| Topology | SAN | SANs<br>Switches in the SANs<br>Zone Set, Zones, Zone Members in the SANs<br>Nodes, Ports connected to the SANs |

*FIG. 9*

TABLE 4

| Scanner | Primary ID | Secondary ID | Cost | Scope |
|---|---|---|---|---|
| Brocade API | SAN | Switches in the SAN | N/A | N/A |
| Subsystem CIM | Subsystem | N/A | N/A | N/A |
| ED/FI | Switch/Port WWN | N/A | Local vs. Remote | # of parameters |
| Topology | SAN | Switches in the SAN | N/A | All vs. Single Switch ("Full" or "Partial" for Topology),<br># of parameters |

*FIG. 10*

INTELLIGENT DISCOVERY OF NETWORK INFORMATION FROM MULTIPLE INFORMATION GATHERING AGENTS

BACKGROUND OF THE INVENTION

1. Field of the Invention

The present invention relates to data storage networks, and especially networks implementing SAN (Storage Area Network) functionality or the like. More particularly, the invention concerns the discovery of network information for network management use in a data storage network environment.

2. Description of the Prior Art

By way of background, data storage networks, such as SAN systems, provide an environment in which data storage devices are managed within a high speed network that is dedicated to data storage. Access to such networks is provided via one or more storage manager servers that handle data storage requests (e.g., copy, backup, etc.) from data client nodes (data clients) via conventional LAN (Local Area Network) or WAN (Wide Area Network) connections. The storage manager servers are programmed data processing platforms that maintain interfaces to the client-side LAN/WAN and to the storage-side data devices that define the data storage network's pool of peripheral storage. These storage devices may include any number of interconnected magnetic disk drive arrays, optical disk drive arrays, magnetic tape libraries, etc. In all but the smallest data storage networks, the required inter-connectivity is provided by way of arbitrated loop arrangements or switching fabrics, with the latter being more common. Typical inter-connectivity components include copper or fiber optic cables, hubs, bridges, gateways, switches, directors, and other data communication equipment designed for high speed data transfer between and among all of the interconnected storage manager servers and storage devices that comprise the data storage network.

One advantage provided by a data storage network is that data belonging to an organizational enterprise can be centrally managed via high level management systems regardless of where the data is located or how it is physically stored and accessed. The management function may be provided at several levels by way of commonly available software tools, including storage management, storage resource management, and storage area network management applications. These applications are variously responsible for monitoring the network storage devices, and their logical integration with the storage manager servers, the network interconnectivity components, and the storage manager servers themselves.

A function required by the aforementioned management software is the ability to discover the various devices and components that comprise the data storage network configuration, identify their attributes, and map their physical and logical relationships. Conventional data storage network management applications use "agents" within the data storage network to perform the required discovery. An agent is a logical entity that resides on a network node, such as a storage manager server, a storage device or a network interconnectivity component. The agent is programmed to provide information about some portion of the data storage network to the supervising management application. For any given management application there are often several agents that need to report information because no one agent may have complete information about the data storage network.

The term "discovery poll" refers to the discovery of data storage network information via a management application's agents, and the subsequent processing of that information by the management application. A discovery poll can be triggered for any number of reasons, such as periodic scheduling, on-demand requests, and asynchronous events. Overall, the discovery process is computationally intensive. Discovery polls can occur with high frequency, there may be a number of agents required to obtain complete information, and the information obtained from each agent may be large and complex depending on the size and complexity of the data storage network configuration. Moreover, because new requests for discovery polls can arise while a previous discovery poll is being processed, the discovery processing can become severely backlogged so that undesirable delays occur in fulfilling the processing requests.

It is to solving the foregoing problems that the present invention is directed. In particular, what is required is a way to simplify network management information discovery and reduce the amount of processor intensive computation required to effectively manage a network.

SUMMARY OF THE INVENTION

The foregoing problems are solved and an advance in the art is obtained by a system, method and computer program product for intelligent discovery of network information from multiple information gathering agents adapted to discover information concerning the network. The discovery agents each have an associated discovery capability. Based on consideration of the agent discovery capabilities, agent discovery assignments are computed and network discovery is performed according to the assignments.

BRIEF DESCRIPTION OF THE DRAWINGS

The foregoing and other features and advantages of the invention will be apparent from the following more particular description of exemplary embodiments of the invention, as illustrated in the accompanying Drawings, in which:

FIG. 6A is a table showing agent discovery capability in the data storage network of FIG. 4;

FIG. 6B is a table showing exemplary agent discovery assignments in the data storage network of FIG. 4;

FIG. 9. is a table showing network information that can be discovered by a set of exemplary scanners in a conventional network manager;

FIG. 10 is a table showing exemplary capability polling information that could be returned by the scanners represented in the table of FIG. 9.

DETAILED DESCRIPTION OF EXEMPLARY EMBODIMENTS

Figure 1:
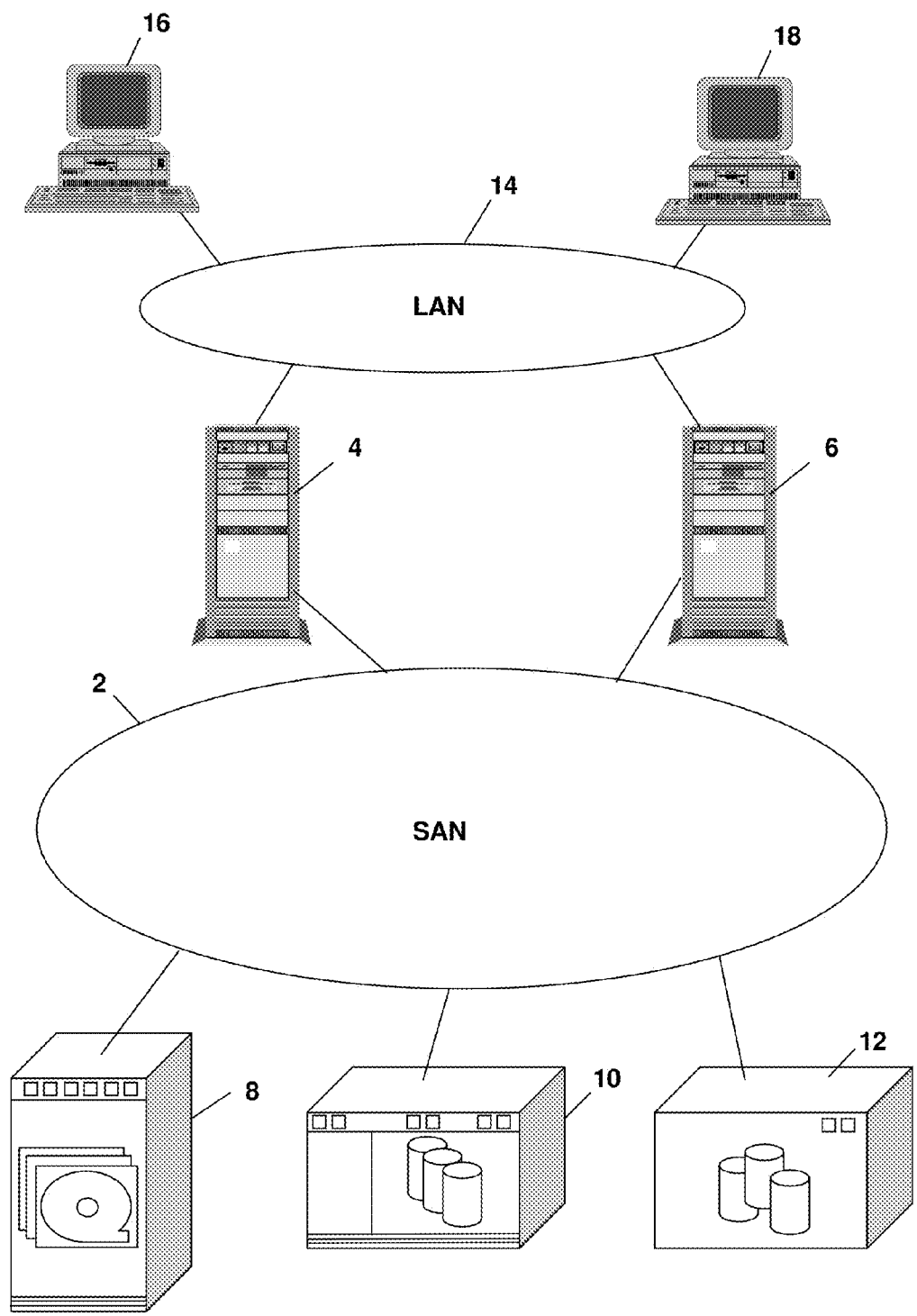
FIG. 1 is a functional block diagram showing a data storage network that represents one exemplary network environment in which the present invention could be implemented.

Turning now to the figures, wherein like reference numerals represent like elements in all of the several views, FIG. 1 illustrates a data storage network set up in a SAN configuration 2 that represents one exemplary environment in which the present invention may be implemented. The SAN 2 includes a pair of storage manager servers 4 and 6 that are interconnected to plural data storage devices by way of a conventional SAN connectivity scheme, such as an arbitrated loop arrangement, a switching fabric, or otherwise. By way of example only, and in the interest of simplicity, the storage devices of the SAN 2 are shown to include only a tape library system 8, RAID (Redundant Array of Inexpensive Disks) system 10 and a JBOD (Just a Bunch Of Disks) system 12. It will be appreciated that in an actual SAN, many additional storage devices could be present. There could also be additional storage manager servers. It should also be understood that the individual connection components that comprise the SAN 2, such as switches, directors, hubs, links, etc., are not shown in FIG. 1.

The storage manager servers 4 and 8 also communicate with a local area network (LAN) 14 (or alternatively a WAN) that comprises one or more data processing clients, two of which are identified as client systems 16 and 18. Data sets associated with the client systems 16 and 18 will be assumed to reside on storage resources within the SAN 2, such as one or more of the storage devices 8, 10 and 12.

There are a variety of computer hardware and software components that can be used to implement the various elements that make up the SAN 2, depending on design preferences. Underlying the SAN design will be the selection of a suitable communication and media technology. Most commonly, a Fibre Channel architecture built using copper or fiber optical media will provide the physical and low level protocol layers. Higher level protocols, such SCSI-FCP (Small Computer System Interface-Fibre Channel Protocol), IPI (Intelligent Peripheral Interface), IP (Internet Protocol), FICON (Fiber Optic CONnection), etc., can be mapped onto the Fibre Channel protocol stack. Selection of the Fibre Channel architecture will dictate the choice of devices that will be used to implement the interconnection components that comprise the SAN 2, as well as the network interface adaptors and controllers that connect the storage manager servers and storage devices to the SAN. Although less commonly, other low level network protocols, such as Ethernet, could alternatively be used to implement the SAN 2.

The storage manager servers 4 and 6 are assumed to be configured as SAN application servers offering the usual SAN access interfaces to the client systems 16 and 18. They can be built from conventional programmable computer platforms that are configured with the hardware and software resources needed to implement the required storage management functions. Exemplary server platforms include the IBM® zSeries®, iSeries™, pSeries™ and xSeries® system products, each of which provides a hardware and operating system platform set, and which can be programmed with higher level SAN server application software, such as the IBM® TIVOLI® Storage Manager system.

The storage devices 8, 10 and 12 can be implemented using any of a variety of data storage device products. By way of example only, the tape library 8 could be an IBM® TotalStorage™ Enterprise Tape System, the RAID array 10 could be an IBM® TotalStorage™ ENTERPRISE STORAGE SERVER® (ESS) System, and the JBOD array 12 could be an IBM® pro SCSI JBOD system. Many other storage systems could also be used.

The network interconnection components may include any number of switches, directors, hubs, bridges, routers, gateways, etc. Such products are conventionally available from a wide array of vendors. The links interconnecting these components may be constructed using copper wiring or single-mode or multi-mode optical fiber, which again are available from a variety of vendors.

As mentioned by way of background above, conventional data storage area networks employ standardized discovery entities, referred to as "agents," that assist high level management applications (network managers) to obtain required data storage network information. One type of agent, referred to as an "inband" agent, is commonly installed on a storage manager server within the data storage network. Another type of agent, referred to as an "outband" agent, is commonly a component of the network manager. Agents may also be installed on storage devices situated in the data storage network. In general, an agent may be thought of as any information gathering entity within (or without) a network having the ability to gather network information within some sphere of discovery capability.

Figure 2:
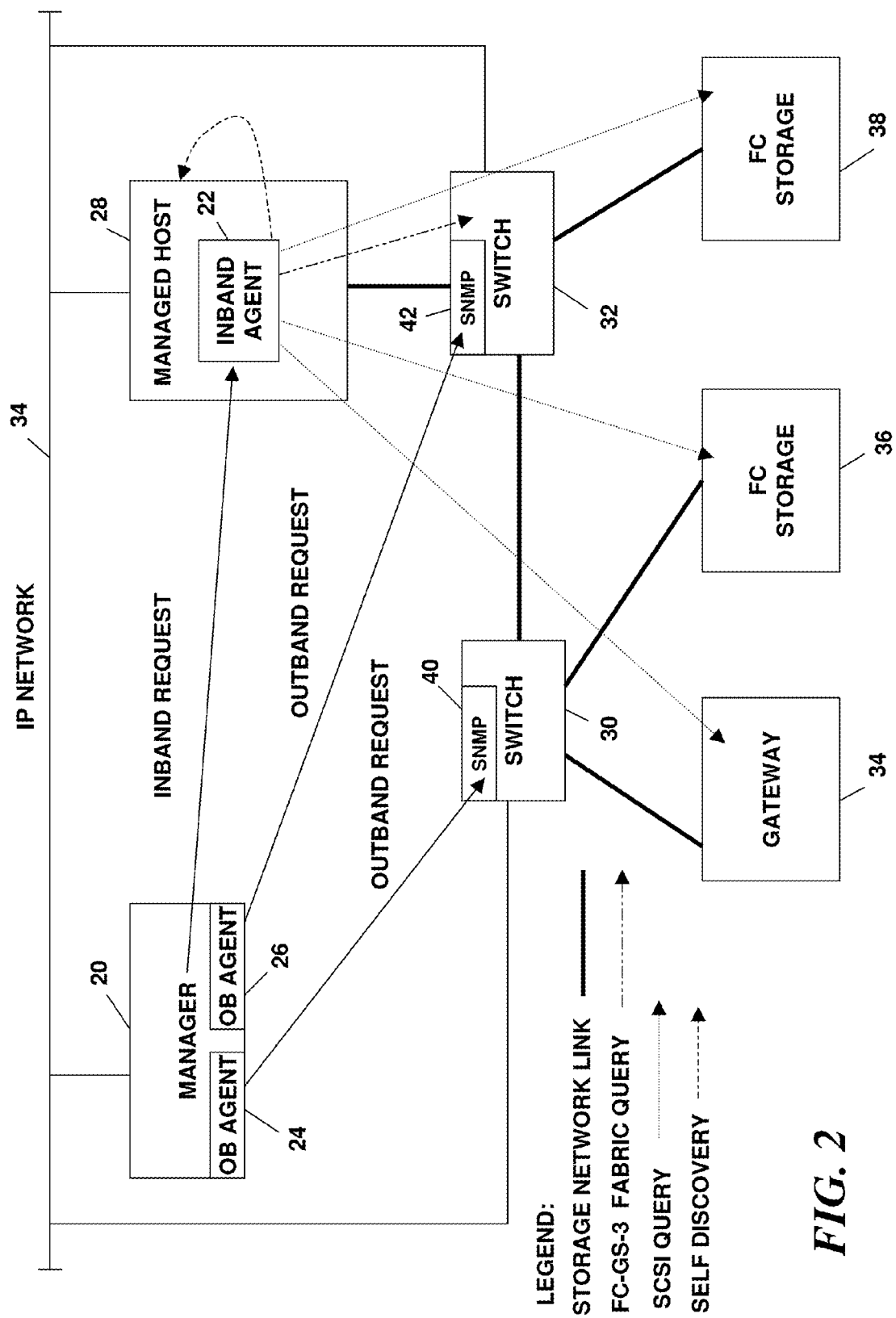
FIG. 2 is a functional block diagram showing a conventional arrangement for managing information in a data storage network.

FIG. 2 illustrates a conventional implementation of a data storage network management system in which a network manager 20 utilizes an inband agent 22 and two outband agents 24 and 26 to perform discovery in a hypothetical data storage network. The inband agent 22 is installed on a storage manager server 28 that is referred to as a managed host. Note that one or both of the storage manager servers 4 and 6 could be managed hosts in the context of the SAN 4 of FIG. 1. The outband agents 24 and 26 respectively reside within the network manager 20. Other data storage network components shown by way of example in FIG. 2 are a gateway 34, and two Fibre Channel storage devices (FC Storage) 36 and 38. As is conventional, the network manager 20 communicates with the inband agent 22 via a communication network, such as the IP network 34, that is separate from the communication pathways of the data storage network being managed. The outband agents 24 and 26 also communicate with the switches 30 and 32, respectively, via the IP network 34.

Discovery requests to the inband agent 22 and the switches 30 and 32 are respectively labeled in FIG. 2 as inband requests and outband requests. These labels stem from the fact that the inband agent 22 conducts discovery by issuing queries via the inband communication pathways (network links) of the data storage network. The outband agents 24 and 26 do not issue queries across the data storage network. They query the switches 30 and 32 via the outband IP network 34.

A variety of inband and outband discovery protocols have been developed for obtaining information about data storage network topology and component attributes. With respect to inband component attribute discovery, devices with SCSI interfaces, such as the storage devices 36 and 38, and the gateway 34, can be polled by the inband agent 22 using SCSI queries to obtain device attribute information, including physical and logical storage unit identification information, port information, and the like. The inband agent 22 may also perform self-discovery to obtain attribute information about the managed host 28, such as file system information, operating system information, and the like. Inband topology queries can be performed by the inband agent 22 using the Fibre Channel GS-3 (Generic Services) protocol (FC-GS-3) and the Fibre Channel FS (Framing and Signaling) protocol (FC-FS) to query the switches 30 and 32 and obtain fabric configuration and end node information. In addition to being responsive to queries from the inband agent 22, all devices implementing SCSI interfaces, HBA drivers, and the FC-GS-3 protocol, will generally support the reporting of device and fabric events as they occur in the data storage network.

With respect to outband discovery, the prevailing protocol is SNMP (Simple Network Management Protocol). The outband agents 24 and 26 can thus be implemented to issue SNMP queries to the switches 30 and 32, as well as receive port topology information and fabric events as they occur in the data storage network. To that end, the switches 30 and 32 will respectively implement SNMP agents 40 and 42 that interact with the outband agents 24 and 26.

Figure 3:
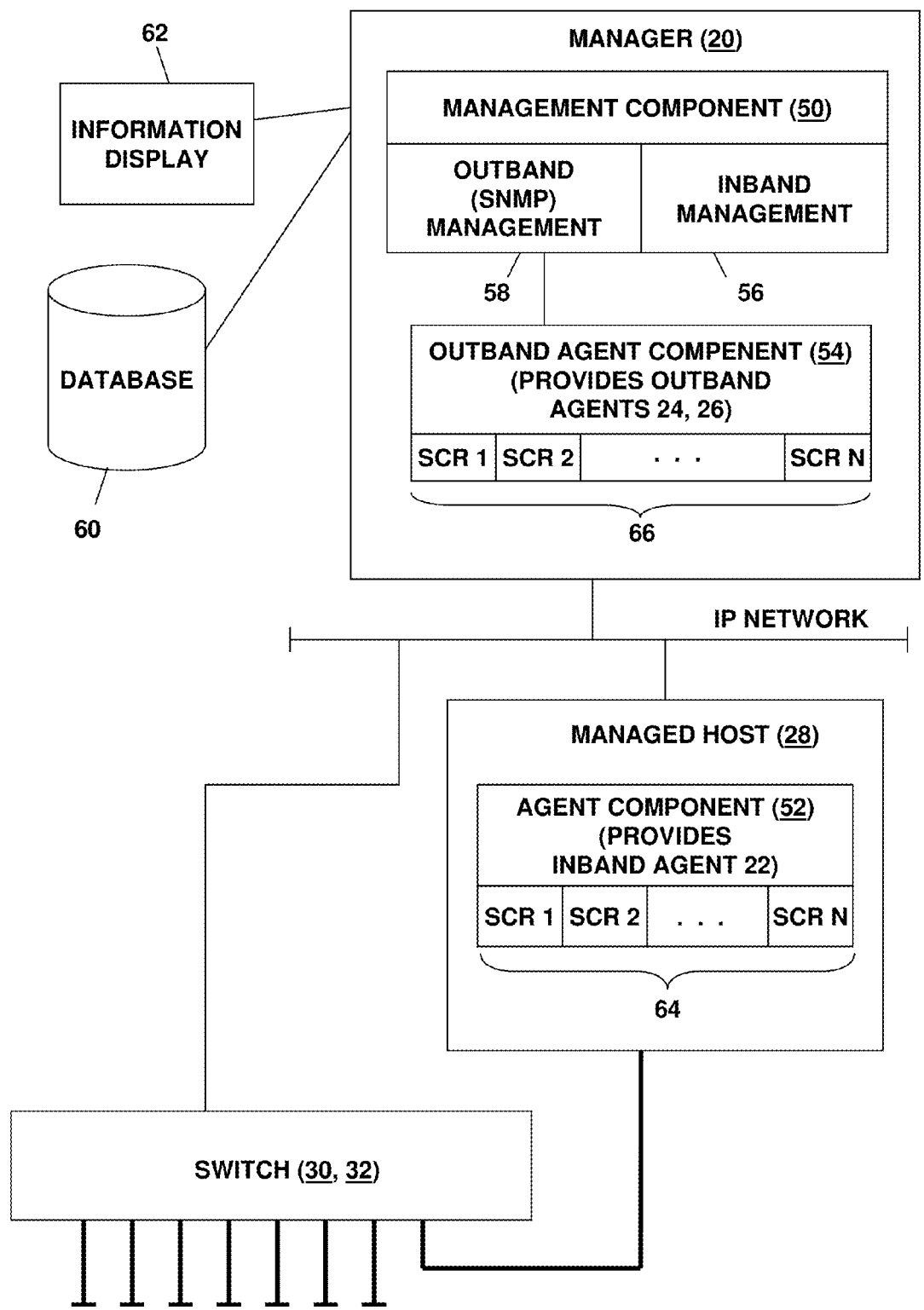
FIG. 3 is a functional block diagram showing components of a conventional network management tool.

The network manager 20 and its agents 22, 24 and 26 can be implemented using any of a variety of conventional network management software products. One example of such a product is the IBM® TIVOLI® Storage Area Network Manager. As shown in FIG. 3, this management tool includes a management component 50, an inband agent component 52 and an outband agent component 54. The management component 50 can be installed on a conventional data processing platform to provide, for example, the network manager 20 of FIG. 2. The inband agent component 52 could then be installed on the managed host 28 of FIG. 2 to provide the inband agent 22. Completing the configuration, the outband agent component 54 could be installed within the manager component 20 of FIG. 2 to provide the outband agents 24 and 26.

The management component 50 of FIG. 3 conventionally includes an inband management subsystem 56 for overseeing inband discovery, and an outband (SNMP) management subsystem 58 for overseeing outband discovery. A database 60 is conventionally employed by the management component 50 for storing discovery information. An information display 62, such as a graphics terminal, can be used to output discovery information in human readable form. The inband agent component 52 conventionally includes a set of scanners 64 that are programmed to obtain attribute and topology information using different discovery protocols. These may include the SCSI protocol, the FC-GS-3 protocol and the FC-FS protocol, as discussed above in connection with FIG. 2. Additional scanners can also be provided, including an ED/FI (Error Detection/Fault Isolation) statistics collection scanner, and a CIM (Common Information Model) subsystem scanner. The outband agent component 54 conventionally includes conventional SNMP support logic. This includes logic for gathering information described by a MIB (Management Information Base), responding to queries from the management component 50, and reporting network events (traps) to the management component. The SNMP support logic can be used to implement one or more outband scanners 66, such as a topology scanner and an ED/FI scanner. Additional scanners can also be provided for implementing proprietary APIs, such as the BROCADE® API (Application Programming Interface) for querying BROCADE® switches.

As described by way of background above, a typical data storage network may have a plurality of agents (inband, outband, or both) with overlapping discovery capability. This situation is exemplified by the hypothetical network of FIG. 4 in which three inband agents 70 (Agent 1), 72 (Agent 2) and 74 (Agent 3) are adapted to report discovery information to a single network manager 76. Agent 1 has the ability to discovery information about the switch A (shown at 78) and devices 1 (shown at 80) and 2 (shown at 82). Agent 3 has the ability to discovery information about the switch B (shown at 84) and devices 3 (shown at 86) and 4 (shown at 88). Agent 2 has the ability to discover information about all of the switches and devices.

Conventional discovery polling would call for each of Agent 1, Agent 2 and Agent 3 to report all discoverable information they are capable of obtaining to the network manager 76 for processing. This is counterproductive because the overlapping capabilities of the agents in terms of the blocks of information they can obtain will result in duplicative processing and redundant information flow, thereby degrading network management performance. The degree of performance degradation is proportional to the number of agents and the size and complexity of the information gathered from those agents. Discovery processing in large, complex data storage networks can thus be significantly affected.

According to the present invention, the foregoing problem is solved by implementing intelligent discovery, whereby redundant blocks of information discoverable by multiple agents are recognized in advance, optimal agent discovery assignments are made, and detailed information associated with each information block is obtained from only one agent. Because the agents no longer gather all available information without restriction, the redundant gathering and processing of network management information is avoided.

Figure 4:
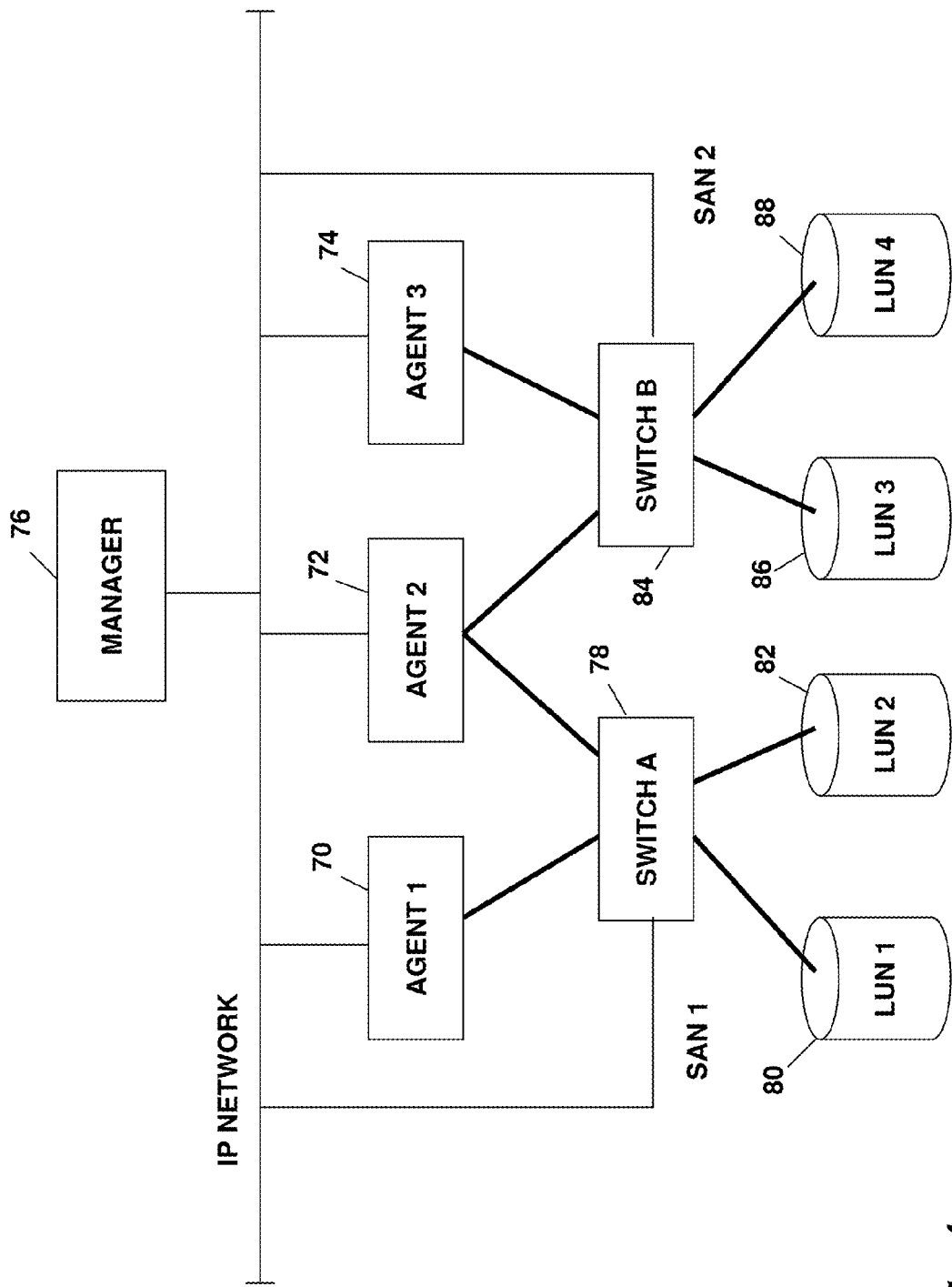
FIG. 4 is a functional block diagram showing a data storage network having multiple agents reporting network management information to a network manager.
Figure 5:
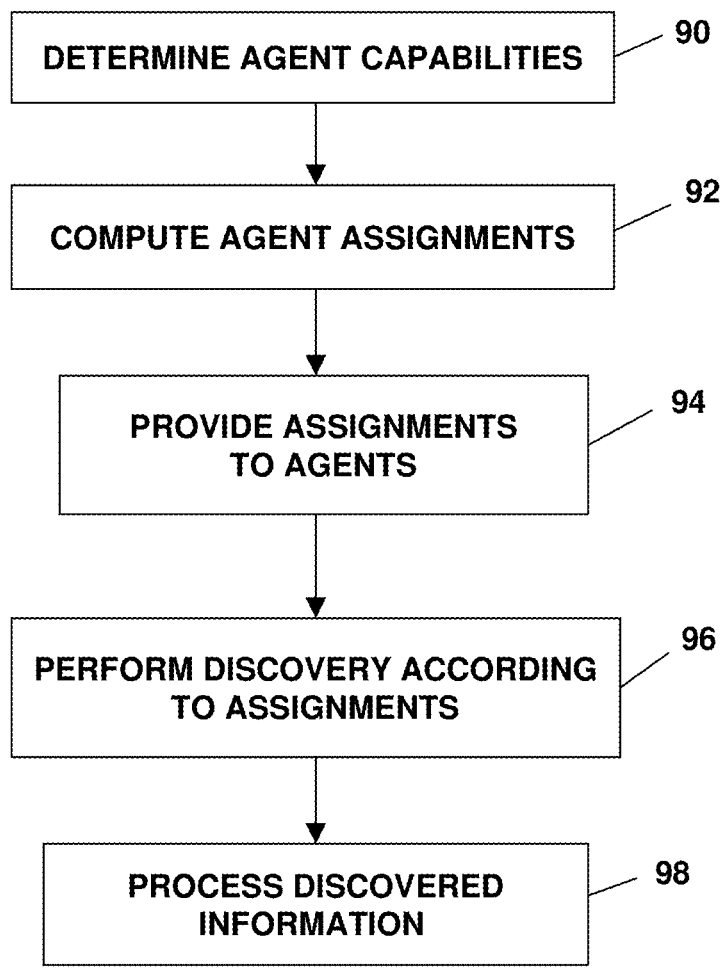
FIG. 5 is a flow diagram showing an example of intelligent discovery processing in accordance with the invention.

FIGS. 5, 6A and 6B illustrate how intelligent discovery can be used to obtain information about the data storage network of FIG. 4, using the network manager 76 and a subset of Agents 1, Agent 2 and Agent 3. FIG. 5 is a flow diagram illustrating an example of how such intelligent discovery can be performed. FIGS. 6A and 6B are tables respectively showing the discovery capabilities and discovery assignments for each Agent. In a first step 90 of FIG. 5, the information gathering capabilities of all agents are determined (e.g., what blocks of information can be gathered by which agents). One way that agent capabilities can be determined is through capability polling, as explained in more detail below. As shown in Table 1 of FIG. 6A, Agent 1 is determined to be capable of discovering information about Switch A and devices connected thereto, Agent 3 is determined to be capable of discovering information about Switch B and devices connected thereto, and Agent 2 is determined to be capable of discovering information about both switches and their connected devices. In step 92 of FIG. 5, the agent assignments are computed. As shown in Table 2 of FIG. 6B, Agent 1 is assigned discovery for Switch A, Agent 2 is assigned discovery for Switch B, and Agent 3 is given no discovery assignment. In step 94 of FIG. 5, the assignments are provided to the agents. In step 96 of FIG. 5, which may be performed subsequent to or in conjunction with step 94, the network manager 76 issues a discovery poll and Agents 1 and 2 perform network discovery according to their assignments. Events that can trigger a discover poll may include any one or more of the following: 1) startup; 2) poll request; 3) scheduled interval; 4) network event received; 5) change in agent capability reported; or 6) agent unable to perform assigned discovery. In step 98 of FIG. 5, the discovered information is returned to the network manager 76 and processed.

Advantageously, it will be seen that the result of intelligent discovery in the foregoing example will be a reduction in redundant gathering and processing of information. Information about the network fabrics associated with Switch A and Switch B will be gathered only once from exactly one agent. The time elapsed to gather the information will be reduced because Agent 2 no longer gathers information for Switch A. Agent 3 is freed from doing any data collection. Also, the switches are not requested to provide the same information twice. The information processed is reduced because detailed data from Agent 3 is not processed.

Figure 7A:
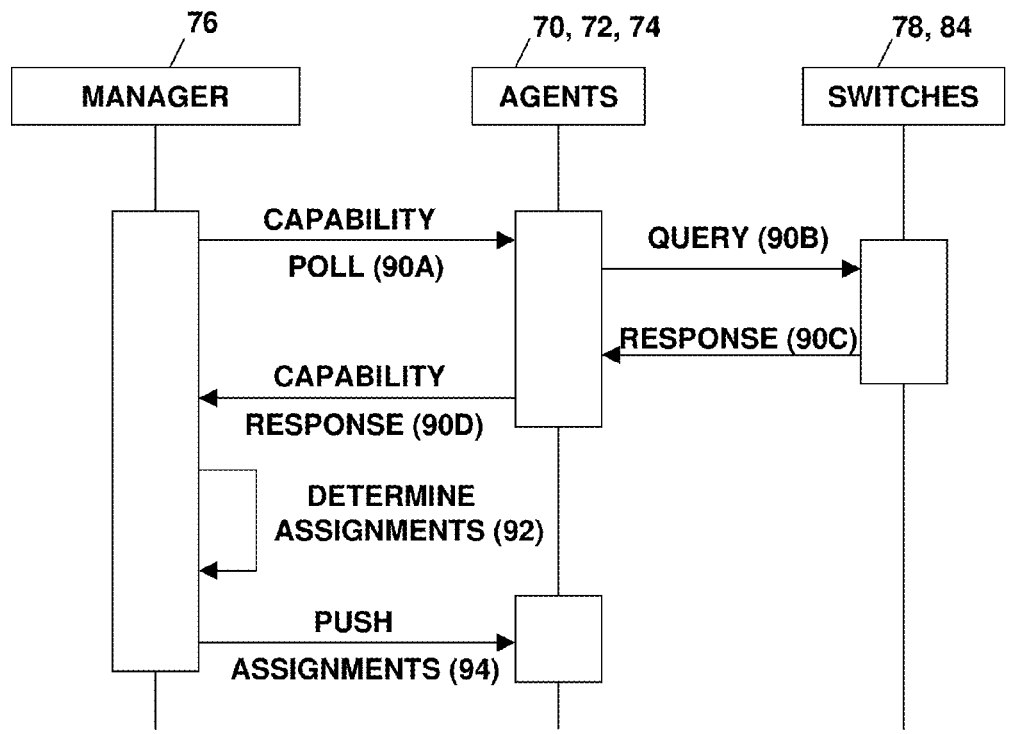
FIG. 7A is a flow diagram showing information exchange between a network manager, and agent and a network device in accordance with a first portion of the process flow of FIG. 5.
Figure 7B:
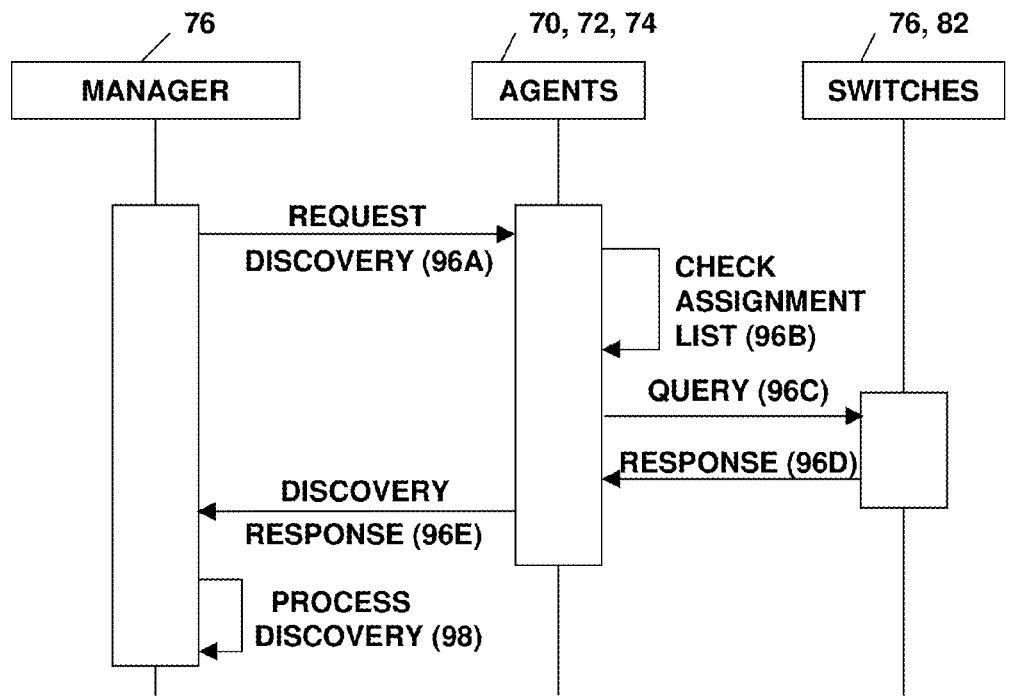
FIG. 7B is a flow diagram showing information exchange between a network manager, and agent and a network device in accordance with a second portion of the process flow of FIG. 5.

The relative functions of the network manager, agents and switches of FIG. 4 that can be performed to implement intelligent discovery are illustrated in FIGS. 7A and 7B. FIG. 7A shows exemplary actions that may be taken to implement the capability determination, assignment computation, and assignment steps of FIG. 5 (steps 90, 92 and 94). FIG. 7B shows exemplary actions that may be taken to implement the discovery polling and discovery processing steps of FIG. 5 (steps 96 and 98). As shown in FIG. 7A, capability determination can be implemented, by way example only, using a capability polling process. The polling process may begin with a capability poll request 90A being sent by the network manager 76 to the agents 70, 72 and 74. This may be followed by each agent issuing a capability query 90B to each switch that is discoverable by the agent. A capability query response 90C may be then returned from the switches to the agents, and the agents may then provide a capability response 90D to the network manager 76. The network manager 76 uses the agent capability information to compute the agent discovery assignments of step 92. The discovery assignments can be provided to the agents, by way of example only, using an assignment push process in which the network manager 76 pushes unique discovery assignments to the agents 70, 72 and 74, where they may be stored for subsequent reference.

As shown in FIG. 7B, discovery polling is comprised of a discovery request 96A being sent by the network manager 76 to the agents 70, 72 and 74. Each agent performs an assignment list check 96B and issues a discovery query 96C to any of the switches 78 and 84 (and storage devices connected thereto) that are on the agent's discovery list. A discovery query response 96D is thereafter returned to the agents, and the agents issue a discovery response 96E to the network manager 76.

In exemplary embodiments of the invention, the above-described capability determination and agent assignment steps can be performed in a manner now to be described, it being understood that other implementations could also be used, depending on network management goals.

Determining Agent Capabilities

The determination of agent capabilities according to step 90, warrants consideration of how often an agent's capabilities are to be determined, and how much capability information is to be obtained. Assuming capability polling is used to determine agent capabilities (as opposed to some other method such as network topology evaluation), the frequency with which capability polling is conducted needs to be considered. An exemplary schedule would call for a capability poll to be performed after any or all of the following events:
 1) A storage network event is detected;
 2) An agent indicates that its capabilities have changed (e.g., it is unable to collect assigned information);
 3) An agent is added or removed;
 4) An agent is upgraded.

Figure 8:
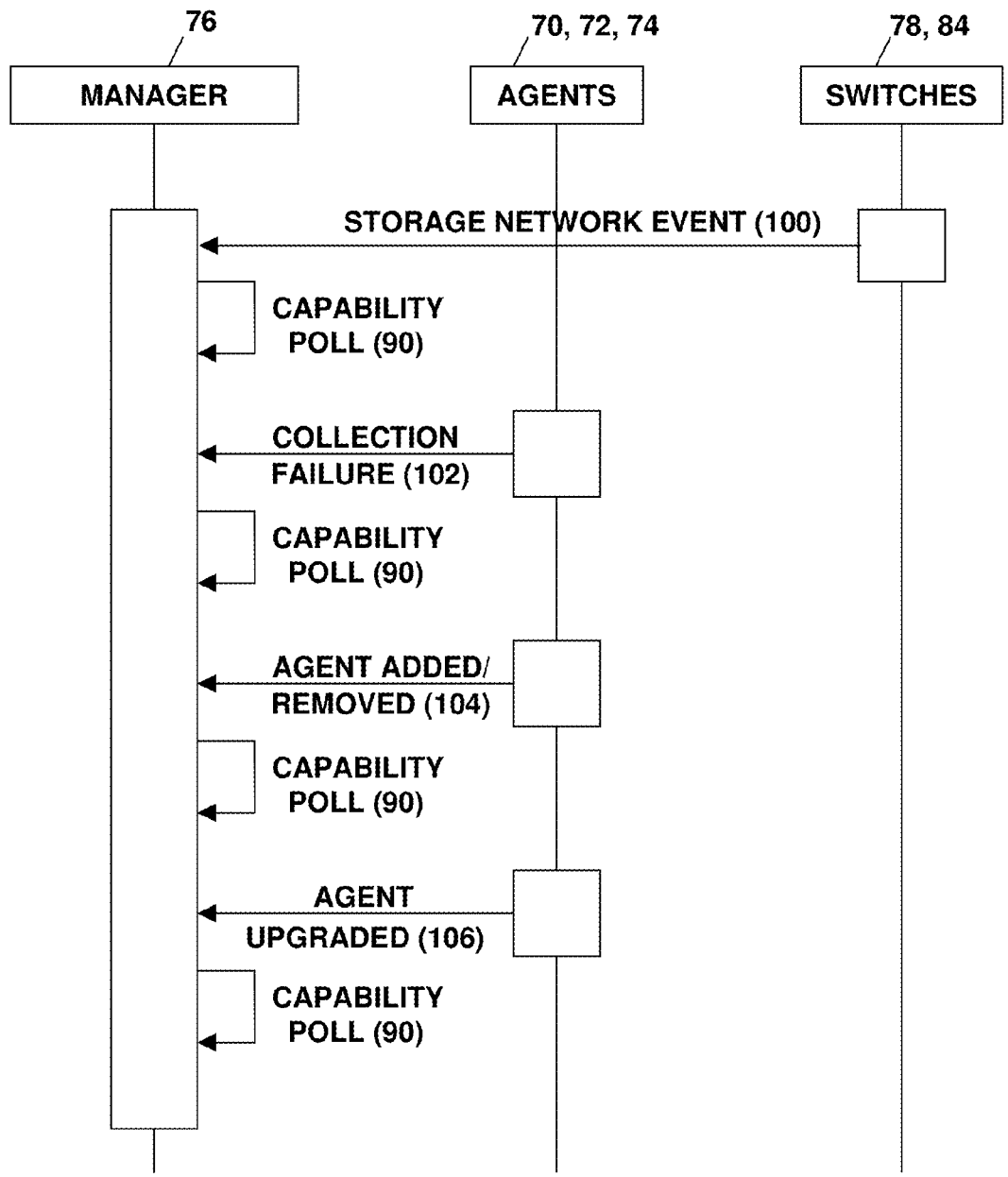
FIG. 8 is a flow diagram showing conditions under which capability polls may be conducted in accordance with the invention.

FIG. 8 illustrates the foregoing capability poll schedule with reference to the network manager, agents and switches of FIG. 4. As shown, a capability poll 90 is conducted in response to a network event 100, a collection failure 102, an agent removal/addition event 104, and an agent upgrade 106.

The capability information returned by a capability poll should be less comprehensive than a full discovery poll if network management performance is to be maximized. Superior performance can be obtained if the capability polls are designed to represent some minimal subset of information required to effect the calculation of agent assignments. Recognizing that network information is commonly available at different levels, beginning at the Network/Fabric level, then descending to the Zone level, and finally to the Host/LUN level, the efficiency of capability polls can be maximized if the polls are limited to the highest possible information level (only capability information for the distinct blocks of information are obtained). This approach is seen in the example given above in which a capability poll in the data storage network of FIG. 4 produces Table 1 of FIG. 6A. Note that Table 1 shows the capability of Agent 1, Agent 2 and Agent 3 only in terms of the network fabrics represented by Switch 1 and Switch 2. The capability poll does not descend down to the level of individual LUNs. Accordingly, whereas a full discovery poll typically returns a complete information hierarchy that identifies all levels of discoverable entities in the path from an agent to all network endpoints reachable by that agent, a capability poll may gather only a small subset of the information, such as the names of one or more switches and/or the name of a network fabric associated with the switches.

The following example provides further illustration as to how capability information can be limited in relation to full discovery information. Table 3 of FIG. 9 shows discovery poll information that might be obtained by a conventional network management tool, such as the IBM® TIVOLI® Storage Area Network Manager, from a data storage network implemented in a SAN configuration. As illustrated in FIG. 3, this product comprises a management component 50, an inband agent component 52 comprising one or more inband scanners 64, and an outband agent component 54 implementing one or more outband scanners 66. As shown in Table 3 of FIG. 9, it will be assumed that there are inband and outband scanners associated with one or more agents that respectively implement one or more of a proprietary API, the CIM protocol, ED/FI statistics collection (inband or outband), and topology discovery (inband or outband). These scanner types are listed in the left hand column of Table 3. The middle column of Table 3 shows the information granularity associated with each scanner type. The right hand column shows the discovery information returned when a discovery query is performed by each scanner type. The XML document format is commonly used to report the discovery information.

Table 4 of FIG. 10 shows capability information that may be reported using the scanners listed in Table 3 of FIG. 9. For each scanner, the capability information of Table 4 is a subset of the discovery information of Table 3. By way of example only, the information may include a PrimaryID identifier, a SecondaryID identifier, a Cost entry, and a Scope entry. The PrimaryID identifier specifies the level of assignment for the scanner type. It is a block identifier for the atomic blocks of information that the scanner can provide. The SecondaryID identifier is an alternate name to ensure proper identification following network transitions that could render the PrimaryID incorrect or ambiguous. The cost entry identifies the work involved in collecting discovery information. For example, the entry for the ED/FI scanner type indicates whether an agent can query local switch ports via an HBA call or whether the scanner needs to issue ELS (Extended Link Service) commands across a network to obtain information about ports in remote switches. The ED/FI cost entry could also indicate whether ED/FI statistics are obtained through outband mechanisms such as MIB or via an inband mechanism such as Fibre Channel queries. The Scope entry identifies the amount of data a scanner can report, and is used to determine if other scanners are required to gather additional information. For a topology scanner, the Scope entry could specify "Full" for an inband topology scanner that can report the topology of an entire network or "Partial" for an outband topology scanner that can only report the topology for a particular switch. For an ED/FI scanner, the Scope entry could list the number of switch/port parameters the scanner can report.

Computing Agent Assignments

The goal of computing agent assignments according to step 92 of FIG. 5 is as follows: Assuming there is a set of agents that can each cover a subset of (e1, e2 . . . em) of discoverable entities, attempt to identify a potentially smaller subset of agents that can cover all the entities in the set of entities (e1, e2 . . . em) along with the assignments for each agent (i.e., the entities that each agent should cover). Where an entity is discoverable by a single agent, that agent will be assigned responsibility for discovering that entity. Where an entity is discoverable by more than one agent, other factors may need to be considered, such as cost (each agent may have a different cost to gather the same information), load (the amount of information that an agent may be assigned to gather), assignment churn (minimizing change in assignments), etc. There are various algorithms that may be used to compute assignments based on one or more of these factors. One approach, which is set forth by way of example only and not by way of limitation, would seek to implement the following goals:

1) Compute a minimum set of agents that can cover all the entities that need to be covered;
2) When an entity can be covered by more than one agent with different costs, assign the agent with the lower cost to cover that entity;
3) When an entity can be covered by more than one agent with the same cost, assign the agent with lower potential assignments to that entity;
4) Compute assignments such that each entity is covered by exactly one agent;
5) Attempt to reduce assignment churn irrespective of the order in which the input data arrives;
6) Attempt to base assignments on load balancing when all other criteria is the same, recognizing that optimal load balancing may not be possible when performed incrementally as assignments are made. After all initial assignments have been made consider reassignments to optimize load balancing if this can be done without excessive assignment churn.

The input to this assignment algorithm can be a map (such as Table 4 of FIG. 10) with the agents as key, and with each agent being associated with a listing of discoverable entities that can be covered by the agent together with a cost value associated with the agent covering each entity. The cost value reflects the fact that there may be differences in the cost of data collection for different agents seeking to obtain discovery of same entity. For example, an agent implementing ED/FI statistics gathering can query the local ports via an HBA call but must issue ELS commands across the data storage network to get information for ports in other systems. Another costing function that may be applicable is the commonly used FSPF (Fabric Shortest Path First) algorithm. The concept of cost evaluation may also include the notion of scope, which as described above refers to the amount of information that an agent can discover (e.g., full or partial topology, number of parameters, etc.).

Following is an exemplary listing of agent discovery capabilities relative to various discoverable network entities:
Agent1 {{Entity2,1}, {Entity5,0}}
Agent2 {{Entity2,0}
Agent3 {{Entity1,0}, {Entity3,1}, {Entity5,2}}
Agent4 {{Entity3,1}, {Entity5,1}}
Agent5 {{Entity3,1}}

The foregoing signifies that Agent 1 can discover Entity 2 with a cost of 1, and Entity 5 with a cost of 0. Agent 2 can discover Entity 2 with a cost of 0. Agent 3 can discover Entity 1 with a cost of 0, Entity 3 with a cost of 1, and Entity 5 with a cost of 2. Agent 4 can discover Entity 3 with a cost of 1, and Entity 5 with a cost of 1. Agent 5 can discover Entity 3 with a cost of 1.

In order to compute agent assignments, the foregoing inputs can be rearranged to create/update a sorted entity map with the entity identifications as key, and with each entity being associated with a set of agents that cover the entity along with their cost. Two sorting operations may be performed. The first sorting operation orders the entities relative to each other. The second sorting operation orders the agents that can cover each entity.

The entity-sorting algorithm initially attempts to order the entities according to the cost of the agents available to cover them. Entities having lowest cost agents (e.g. agents with a cost of 0) are listed first, followed by entities having higher cost agents (e.g., agents with a cost of 1, 2, etc.). Among entities having agents with the same cost, those with the fewest number of agents having that cost are listed first. If entities have the same number of agents having the same cost, the lexicographic value of the entity identifier is used as the ordering criteria. By sorting the entities in this manner, entities having the smallest number of lowest cost agent assignment choices are processed before entities having a larger number of lowest cost agent assignment choices. This helps in load balancing because assignments will not be made unnecessarily to agents early on when there is a possibility of the agents being overloaded with assignments in later processing because there are entities that can be only covered by those agents. Applying the foregoing entity sorting criteria to the input agent capability map set forth above yields the following sorted entity map:
Entity1 {{Agent3,0}}
Entity3 {{Agent3,1}, {Agent4,0}, {Agent5,1}}
Entity2 {{Agent1,0}, {Agent2,0}}
Entity5 {{Agent1,1}, {Agent3,2}, {Agent4,1}}

The agent-sorting algorithm is now performed for each entity, beginning with the top of the entity list and moving downwardly therethrough. According to this algorithm, the set of agents that can cover an entity are first sorted by cost, then load factor and then by the agent identifier. The load factor is the sum of the number of current assignments for an agent and the number of entities to which the agent can be assigned (the number of entities that can be covered by the agent). Applying the foregoing agent sorting criteria to the input agent capability map set forth above, yields the following sorted entity, sorted agent map:
Entity1 {{Agent3,0}}
Entity3 {{Agent4,0}, {Agent5,1}, {Agent3,1}}
Entity2 {{Agent1,0}, {Agent2,0}}
Entity5 {{Agent1,1} {Agent4,1}, {Agent3,2}}

The first agent in the sorted set of agents for an entity in the above map is picked to cover that entity and an assignment is created/updated in an output sorted map (the assignment may be a new assignment or a reassignment). The key of the map is the agent identifier and the value is a sorted set of entities that are assigned to that agent. Using the foregoing sorted entity, sorted agent map as input, the following assignment map would be generated:
Agent1 {{Entity2}, {Entity5}}
Agent2 { }
Agent3 {{Entity1}}
Agent4 {{Entity3}}
Agent5 { }

Note that it may not be possible to equitably distribute the assignments, as shown by the fact that Agent 2 has no assignment even though it can cover Entity2 and could be assigned that entity to reduce the load on Agent1. The foregoing anomaly stems from the fact that the capabilities of agents are not necessarily uniform, and some agents will be able to cover fewer entities than others. Also, there may be several entities that can be covered by only one agent, or only one agent with the lowest cost. There may be various overlaps in coverage between entities. Also, depending on the order in which the assignment decisions are made, the assignment loads may change. Given this, the above assignment algorithm first computes assignments for those entities for which there is a clear choice (entities that can be covered by only one agent or only one agent with lowest cost). This is done so that this can be factored into the load for those agents when making subsequent assignments. If the input is distributed such that there are some agents which can cover fewer entities and there are others that can cover a larger number of entities, the algorithm attempts to make assignments such that the agents which can cover a larger number of entities are assigned far less than that number. For agents with a smaller number of entities the maximum possible assignments are made. This is done by picking agents with fewer assignment possibilities at the beginning of the assignment cycle. At some crossover point, the sum of current and possible assignments for agents that can cover fewer entities is larger than the possible assignments for agents which can cover more entities. At this point the latter agents start getting picked. The actual load distribution is based on the actual input data (how the coverages overlap, etc) and for certain input data it may still not be possible to perform efficient load balancing.

Note that the foregoing algorithm computes assignments for all entities to be computed. As an alternative, it may be desirable to compute assignments only for those entities for which there was a change in input (one or more agents can additionally cover that entity or not cover that entity). The advantage of the first approach is that it takes into consideration the overall effect on load balancing due to the modified input. The downside is that there is a penalty associated with recomputing assignments for all agents. It may also be desirable if the agent to which an entity is currently assigned is also treated as a sorting criterion, in order to minimize assignment churn.

Client-Server Model

Although agents can be issued discovery assignments based solely on an agent assignment computation scheme as described above, assignments could be further based on the notion of agents acting as discovery servers on behalf of network managers acting as discovery clients. According to this paradigm, the agents in a data storage network may be thought of as offering an array of data collection services. Network managers can register for a specific set of such services according to the needs of the management system. This allows a plurality of network managers to use the same set of discovery agents for different purposes. Agent assignments can thus be based not only on discovery efficiency considerations, but also on the discovery service registrations of the network manager(s). The latter could be used as a filter to initially determine what discovery information is required from each agent, and then assignments can be made based on agent discovery capabilities relative to the required data.

Processing Failover and Missing Logic Conditions

An additional factor that needs to be considered in implementing intelligent discovery in accordance with the invention is the ability to address failovers and missing logic conditions. Limiting the number of agents that are gathering information from network devices introduces situations where the agents being used may no longer be able to gather all the information needed due to configuration changes, topology changes, error conditions, or the addition/removal of agents. It is therefore desirable to handle interruptions in the data collection ability of an agent and to switch over to other agents, if possible. There may also be situations where information from multiple agents is required, such as to isolate a failing link that one agent can no longer detect but which may be detectable by other agents. Fault tolerance may also be required in high availability environments by instituting some degree of pre-planned redundancy (e.g., using industry-accepted fault tolerance techniques). A simple example would be to employ two agents for certain types of discovery information.

In a conventional network management system with overlapping agent assignments, failover and missing logic conditions are not as problematic because of the information redundancy. What typically occurs is that each agent responding to a discovery poll request returns an information set of the type illustrated in Table 3 of FIG. 9. By comparing the returned information set with an earlier copy of the same set, each agent can flag missing entities. In many cases, the missing entities will be reported in the information sets of other agents. Only if the missing entities are not found in any information set returned by any agent, meaning that no agent is able to see the entities, will the entities be designated as missing by the network manager.

The situation becomes more complicated when intelligent discovery is performed because it is assumed that agent assignments are unique. Entities flagged as missing by a given agent are therefore unlikely to be detected by any other agent under the current agent assignment scheme. However, before the entities can be designated as missing by the network manager, a determination must be made as to whether the entities are within the capability of any other agent. If they are, the entities can be assigned to the other agent and that agent can check for the entities in the next discovery poll. This consensus building process can be repeated for all agents that share the capability for detecting the missing entities. Only if no such agent is successful in detecting the missing entities will the entities be designated as missing by the network manager.

Although missing entity detection in an intelligent discovery environment is thus much the same as that used in conventional network management systems, it must be extended to account for capability information and the possibility that multiple agents having the required capability exist and need to be tested before an entity can be designated as missing.

It is recognized that there may be a performance benefit if missing entity detection was based on capability polls performed whenever a network event occurs (see FIG. 8). If the capabilities of the agents have changed, the missing entities might be detected by comparing the recalculated capabilities with pre-event capabilities and identifying the capability delta. The problem with this approach is that only a full discovery poll will confirm whether an entity is still discoverable by other capabilities.

Accordingly, a system and method have been disclosed for performing intelligent discovery of network information from multiple overlapping information gathering agents. It will be appreciated from the foregoing that the system of the invention can be implemented as a software modification to an existing data storage management application and its agents (inband, outband or both), while the method can be performed by way of the modified software and the hardware that it controls. In a further aspect, the invention can be embodied in a computer program product in which the software required to implement the functions of the invention are stored in object or source code form on a data storage medium, such as one or more portable (or non-portable) magnetic or optical disks.

Figure 11:
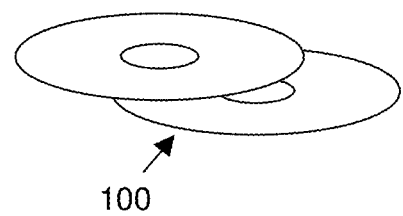
FIG. 11 is a perspective view of an exemplary form of computer program product that may be implemented in accordance with the invention.

FIG. 11 illustrates an exemplary computer program product 100 in which the storage medium comprises one or more optical disks. The computer program product 100 can be used by a storage network administrator to add functionality in accordance with the invention to a conventional data storage network management tool. In a typical scenario, a copy of the code resident on the computer program product 100 will be installed onto a computer platform that hosts the management application and on data processing hosts that run discovery agents, so that the code is copied onto a local data storage medium associated with the data processing entity. If the code is in binary form it will be ready for execution. If the code is in source code form, the code can be compiled as necessary to reduce it to executable form.

While various embodiments of the invention have been described, it should be apparent that many variations and alternative embodiments could be implemented in accordance with the invention. For example, instead of pushing assignment information to agents in advance of discovery polls, assignments could be specified as part of discovery poll requests issued to agents by the network manager. A further modification would be to calculate agent assignments based on topology information obtained from discovery polls without the use of capability polls. Various algorithms can be applied to compute assignments. Moreover, it is conceivable that the agents may compute their own assignments instead of a network manager computing them. Although the invention has been described in the context of a data storage network, and particularly a SAN, it will be appreciated that the invention could be implemented in domains other than SANs and data storage networks. It is understood, therefore, that the invention is not to be in any way limited except in accordance with the spirit of the appended claims and their equivalents.

What is claimed is:

1. A network manager system for managing a data storage network, comprising:
    one or more processors;
    memory operatively coupled to said one or more processors;
    program instructions in said memory for programming said one or more processors to perform network manager operations, said operations comprising:
    performing a discovery agent capability determination that determines discovery capabilities of two or more discovery agents in said data storage network;
    detecting, prior to discovery execution, whether a discovery capability overlap condition exists wherein said discovery capabilities are overlapping due to some of said agents being capable of discovering the same information from the same network device;
    computing agent discovery assignments prior to discovery execution based on said discovery agent capability determination and according to whether a discovery overlap condition exists;
    collectively, said agent discovery assignments being computed as a subset of said agent discovery capabilities in response to said discovery capability overlap condition being detected to reduce overlapping discovery;
    said agent discovery assignments being based on an input listing of said discovery agents, the network devices they are capable of discovering and a cost to discover each network device, and an output listing of said discovery agents and the network devices said discovery agents are assigned to discover;
    said agent discovery assignments being further based on an entity-sorting computation that produces an entity-sorting listing that associates each network device and one or more discovery agents each having a cost to discover that network device, said listing ordering said network devices according to the discovery costs of the associated discovery agents; and
    said agent discovery assignments being further based on an agent-sorting computation that produces an agent-sorting listing that modifies said entity-sorting listing to order the discovery agents associated with each network device according to one or more of agent cost, load factor and agent identifier.

2. The system of claim 1 wherein said agent discovery assignments are computed such that (1) no network device is discovered more than once by different discovery agents seeking the same information, (2) one or more agents are not permitted to perform full discovery of information due to one or more other discovery agents being assigned to discover the same information, and (3) no duplicate discovery information is generated.

3. The system of claim 1 wherein said agent discovery assignments are computed based which said discovery agents having overlapping discovery capabilities are most fit to receive said agent discovery assignments.

4. The system of claim 1 wherein said agent discovery assignments reflect one or more of data collection service registrations in which said network manager registers with said discovery agents and receives information regarding specified discovery, agent cost to obtain network information, load balancing among said discovery agents, and assignment churn.

5. The system of claim 1 wherein said agent discovery assignments comprise both inband and outband discovery assignments.

6. The system of claim 1 wherein said agent discovery assignments are provided to said discovery agents for storing at said discovery agents for subsequent reference.

7. A machine-implemented method for managing a data storage network, comprising:
    performing a discovery agent capability determination that determines discovery capabilities of two or more discovery agents in said data storage network;
    detecting, prior to discovery execution, whether a discovery capability overlap condition exists wherein said discovery capabilities are overlapping due to some of said agents being capable of discovering the same information from the same network device;
    computing agent discovery assignments prior to discovery execution based on said discovery agent capability determination and according to whether a discovery overlap condition exists;
    collectively, said agent discovery assignments being computed as a subset of said agent discovery capabilities in response to said discovery capability overlap condition being detected to reduce overlapping discovery;
    said agent discovery assignments being based on an input listing of said discovery agents, the network devices they are capable of discovering and a cost to discover each network device, and an output listing of said discovery agents and the network devices said discovery agents are assigned to discover;
    said agent discovery assignments being further based on an entity-sorting computation that produces an entity-sorting listing that associates each network device and one or more discovery agents each having a cost to discover that network device, said listing ordering said network devices according to the discovery costs of the associated discovery agents; and said agent discovery assignments being further based on an agent-sorting computation that produces an agent-sorting listing that modifies said entity-sorting listing to order the discovery agents associated with each network device according to one or more of agent cost, load factor and agent identifier.

8. The method of claim 7 wherein said agent discovery assignments are computed such that (1) no network device is discovered more than once by different discovery agents seeking the same information, (2) one or more agents are not permitted to perform full discovery of information due to one or more other discovery agents being assigned to discover the same information, and (3) no duplicate discovery information is generated.

9. The method of claim 7 wherein said agent discovery assignments are computed based which said discovery agents having overlapping discovery capabilities are most fit to receive said agent discovery assignments.

10. The method of claim 7 wherein said agent discovery assignments reflect one or more of data collection service registrations in which said network manager registers with said discovery agents and receives information regarding specified discovery, agent cost to obtain network information, load balancing among said discovery agents, and assignment churn.

11. The method of claim 7 wherein said agent discovery assignments comprise both inband and outband discovery assignments.

12. The method of claim 7 wherein said agent discovery assignments are provided to said discovery agents for storing at said discovery agents for subsequent reference.

13. A computer program product, comprising:
one or more non-transitory computer-readable storage media;
software code stored on said one or more storage media for programming a data processing system perform network management operations for discovering information about a network, said operations comprising:
performing a discovery agent capability determination that determines discovery capabilities of two or more discovery agents in said data storage network;
detecting, prior to discovery execution, whether a discovery capability overlap condition exists wherein said discovery capabilities are overlapping due to some of said agents being capable of discovering the same information from the same network device; computing agent discovery assignments prior to discovery execution based on said discovery agent capability determination and according to whether a discovery overlap condition exists;
collectively, said agent discovery assignments being computed as a subset of said agent discovery capabilities in response to said discovery capability overlap condition being detected to reduce overlapping discovery;
said agent discovery assignments being based on an input listing of said discovery agents, the network devices they are capable of discovering and a cost to discover each network device, and an output listing of said discovery agents and the network devices said discovery agents are assigned to discover;
said agent discovery assignments being further based on an entity-sorting computation that produces an entity-sorting listing that associates each network device and one or more discovery agents each having a cost to discover that network device, said listing ordering said network devices according to the discovery costs of the associated discovery agents; and
said agent discovery assignments being further based on an agent-sorting computation that produces an agent-sorting listing that modifies said entity-sorting listing to order the discovery agents associated with each network device according to one or more of agent cost, load factor and agent identifier.

14. The computer program product of claim 13 wherein said agent discovery assignments are computed such that (1) no network device is discovered more than once by different discovery agents seeking the same information, (2) one or more agents are not permitted to perform full discovery of information due to one or more other discovery agents being assigned to discover the same information, and (3) no duplicate discovery information is generated.

15. The computer program product of claim 13 wherein said agent discovery assignments are computed based which said discovery agents having overlapping discovery capabilities are most fit to receive said agent discovery assignments.

16. The computer program product of claim 13 wherein said agent discovery assignments reflect one or more of data collection service registrations in which said network manager registers with said discovery agents and receives information regarding specified discovery, agent cost to obtain network information, load balancing among said discovery agents, and assignment churn.

17. The computer program product of claim 13 wherein said agent discovery assignments comprise both inband and outband discovery assignments.

18. The computer program product of claim 13 wherein said agent discovery assignments are provided to said discovery agents for storing at said discovery agents for subsequent reference.

* * * * *